United States Patent [19]
Arnold et al.

[11] 3,804,386
[45] Apr. 16, 1974

[54] SPRAY MANIFOLD

[75] Inventors: Orlan M. Arnold, Grosse Pointe Park, Mich.; Michael F. Horn, Stamford, Conn.

[73] Assignee: Peabody Engineering Corporation, New York, N.Y.

[22] Filed: Sept. 13, 1971

[21] Appl. No.: 179,945

[52] U.S. Cl............. 261/71, 261/DIG. 54, 261/118, 239/597
[51] Int. Cl................................................ B01f 3/04
[58] Field of Search............ 239/597, 567; 261/116, 261/DIG. 54, DIG. 61–64, 118, 71

[56] References Cited
UNITED STATES PATENTS

| 2,832,642 | 4/1958 | Lennox | 239/597 |
|---|---|---|---|
| 1,751,960 | 3/1930 | Veenstra | 239/597 |
| 3,027,355 | 3/1962 | Taul et al. | 239/567 X |
| 228,765 | 6/1880 | Kennedy | 261/118 |
| 1,016,491 | 2/1912 | Guild | 55/DIG. 20 |
| 1,102,996 | 7/1914 | Bottenstein | 261/118 |
| 1,274,070 | 7/1918 | Morton | 261/62 |
| 1,291,840 | 1/1919 | Gran | 55/DIG. 20 |
| 2,604,185 | 7/1952 | Johnstone et al. | 261/118 |
| 3,112,352 | 11/1963 | Krantz | 261/DIG. 54 |
| 3,116,348 | 12/1963 | Walker | 261/DIG. 54 |
| 3,287,001 | 11/1966 | Harris | 261/118 |
| 3,490,204 | 1/1970 | Kalika | 261/118 |
| 3,524,630 | 8/1970 | Marion | 261/118 |
| 3,530,807 | 9/1970 | Zalman | 261/118 |
| 3,541,601 | 11/1970 | Witte et al. | 261/118 |
| 2,215,181 | 9/1940 | Knowles et al. | 210/150 X |

FOREIGN PATENTS OR APPLICATIONS

| 25,954 | 6/1911 | Great Britain | 55/DIG. 20 |
|---|---|---|---|
| 915,698 | 11/1946 | France | 261/118 |
| 9,742 | 2/1923 | Netherlands | 261/DIG. 39 |

Primary Examiner—Tim R. Miles
Attorney, Agent, or Firm—N. L. Leek; Robert H. Bachman

[57] ABSTRACT

A spray manifold, particularly for the inside of an annular vessel, having an annular liquid passage and having in its inner peripheral wall an annular slot forming a spray opening through which an inwardly directed radial spray is ejected around its entire periphery. The annular passage may be tapered in section to compensate for the liquid flow. The manifold may be adjustable along the vessel walls by means of a telescoping inlet pipe. Reverse flow is provided for flushing out the annular passage.

9 Claims, 9 Drawing Figures

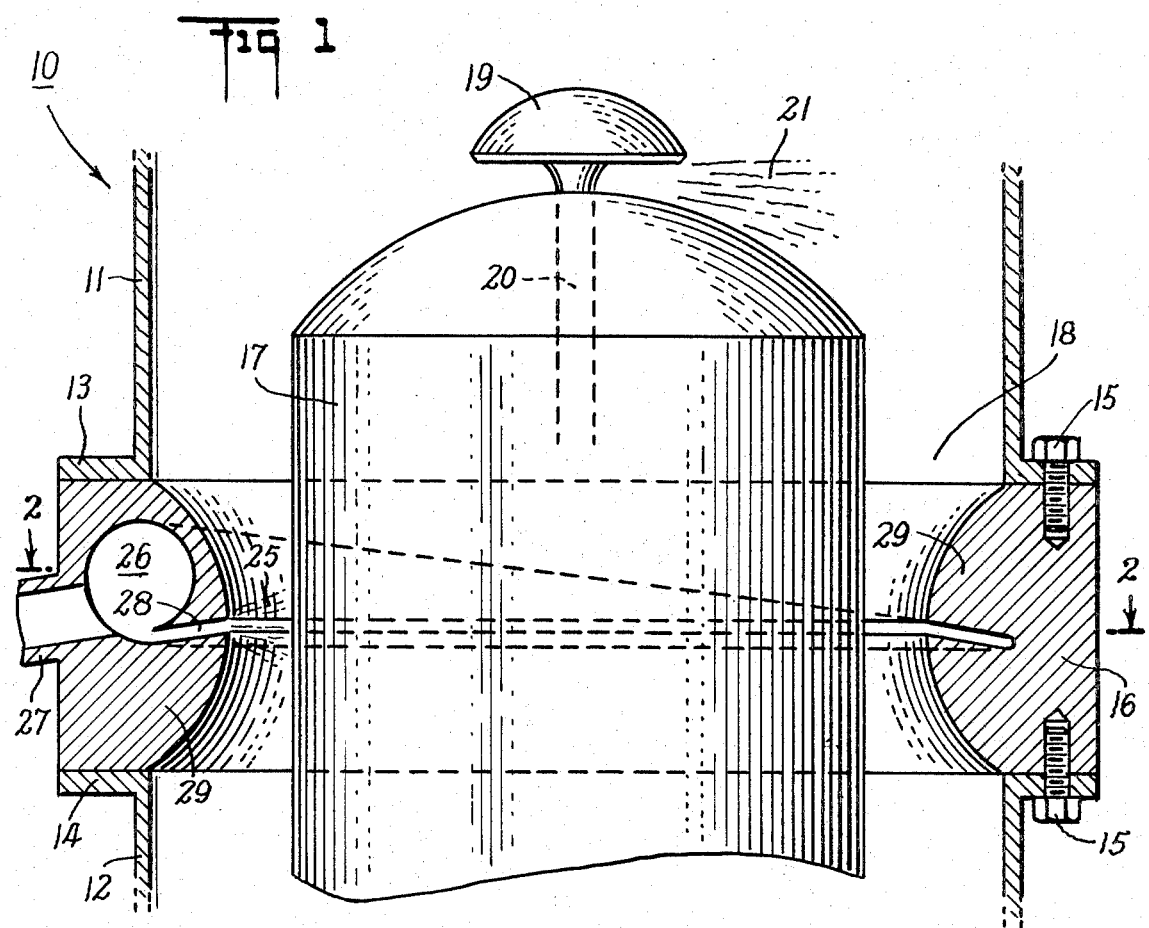
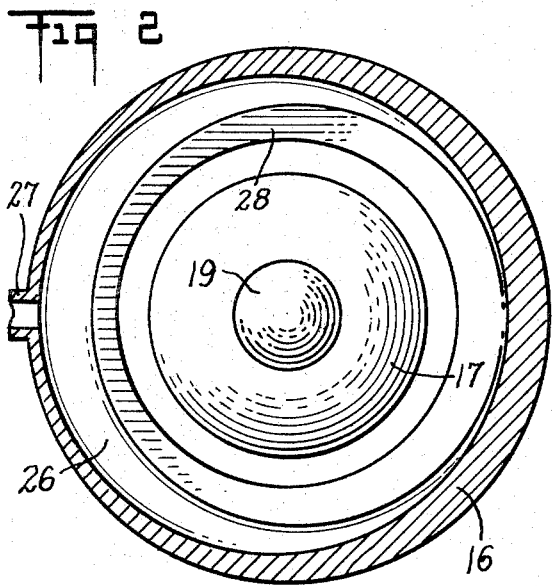
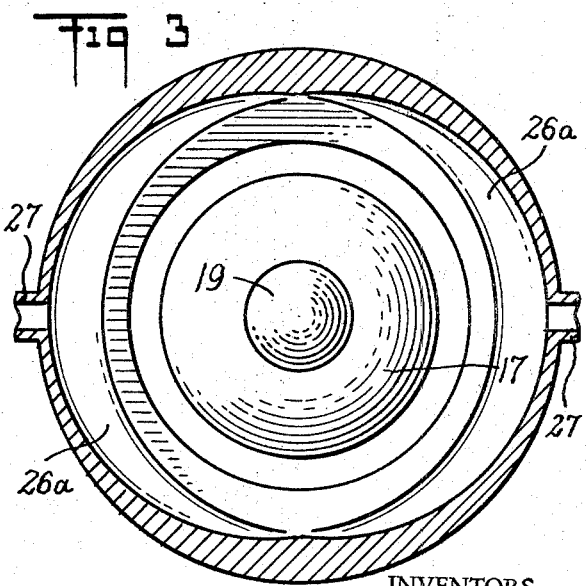

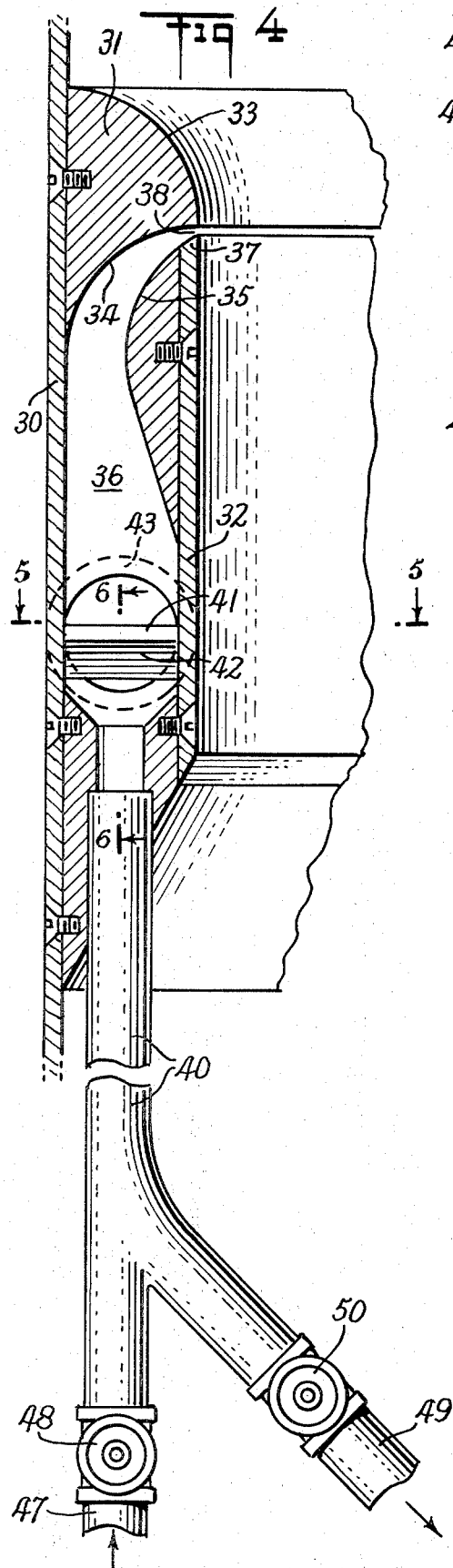

SPRAY MANIFOLD

This invention relates to apparatus for forming a liquid spray and more particularly to a spray manifold disposed peripherally around a spray zone for producing an inwardly directed spray across said zone.

An object is to provide means for producing a spray of high kinetic energy extending from the periphery inwardly over the spray zone.

Another object is to provide a uniform and intense spray projecting inwardly from the periphery of the spray zone.

Another object is to provide a uniform spray extending inwardly across the path of a gas stream in a gas washing apparatus.

Another object is to provide a peripheral spray source having novel and improved characteristics for use in a gas washing apparatus.

Various other objects and advantages will be apparent as the nature of the invention is more fully disclosed.

In accordance with the invention the spray source comprises an annular manifold extending wholly or partly around the periphery of the spray zone and having an annular spray orifice through which an inwardly directed spray is projected. In one embodiment the liquid passage in the manifold is compensated from the zone of the liquid inlet for the progressive discharge of the liquid around its periphery.

The device is particularly applicable to a gas washing apparatus of the type disclosed in copending U.S. Pat. application Ser. No. 155,916 wherein an annular gas passage is formed between the outer wall of the vessel and an axial central post. A radially outwardly directed spray is projected across the gas stream from an axial nozzle and a radially inwardly directed spray is discharged from a peripheral spray manifold. Both of these sprays pass transversely through the gas stream in the annular passage and the sprays may impinge upon each other or may be axially offset according to the effect desired.

The present invention relates to the annular spray manifold for use in such apparatus although it may also be used in various instances where a spray of this type is desirable.

In various embodiments the spray passage may be fed from one or more inlets disposed around its periphery with suitable means to cause the liquid to flow peripherally along the passage and with provision for flushing out any sediment or other accumulation from the system. The manifold may be fixed axially or may be adjustable for locating the spray pattern properly in the washing zone.

The specific nature of the invention will be better understood from the following description, taken in connection with the accompanying drawings in which certain specific details have been set forth for purposes of illustration.

In the drawings:

FIG. 1 is a partial vertical section through a gas washing apparatus illustrating the present invention as embodied therein;

FIG. 2 is a horizontal section showing an annular spray manifold having a single liquid inlet;

FIG. 3 is a section similar to FIG. 2 showing a spray manifold with a pair of opposed liquid inlets;

FIG. 4 is a partial vertical section through a manifold formed by separate upper and lower annular elements;

FIG. 5 is a complete section taken on line 5—5 of FIG. 4 of the manifold showing the location of liquid supply pipes and a tangential opening for flushing liquid;

FIG. 6 is a detail sectional view taken on line 6—6 of FIG. 4 showing the supply liquid deflector for directing the liquid through the annular passage in opposite directions;

Figure 7:
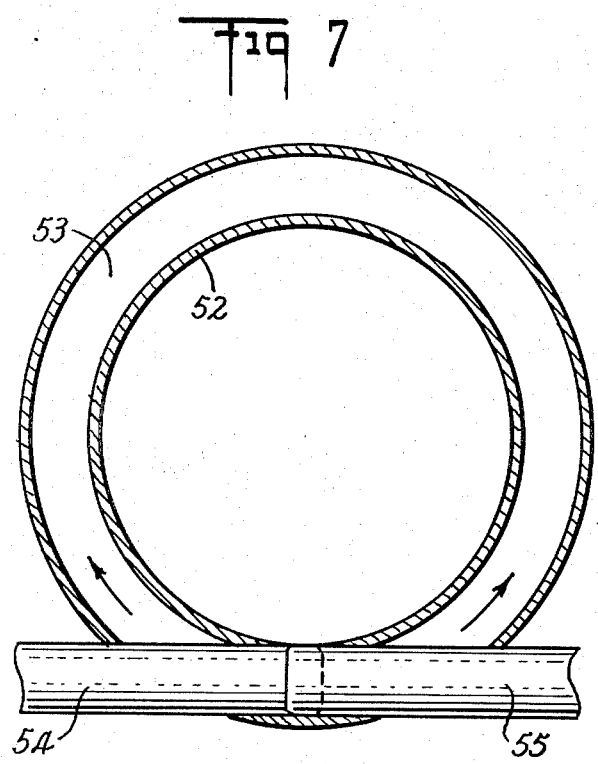
FIG. 7 is a view similar to FIG. 5 showing a manifold having a pair of opposed tangential liquid inlets.

Referring to the drawings more in detail, the invention is shown as embodied in a gas washing apparatus of the type disclosed in the copending application above mentioned, a portion of which only is shown in FIG. 1. This apparatus comprises a vessel 10 having upper and lower wall portions 11 and 12 respectively provided with flanges 13 and 14 which are secured as by bolts 15 to a manifold housing 16 to form a fluid tight seal. A central axial post 17 is disposed within the vessel 10 to form with the walls 11 and 12 an annular gas passage 18. A spray nozzle 19 is carried by a pipe 20 which extends through the post 17 and is adapted to project a uniform spray 21 of liquid radially outwardly across the passage 18 around its entire periphery.

The gas for washing is supplied into the top of the vessel 10 by means not shown and passes downwardly in the annular passage 18 through the spray projected from the nozzle 19 and into suitable collecting and drying apparatus in which the entrained droplets and suspended particulate material is removed. Such apparatus is disclosed in detail in said copending application and only so much thereof as is necessary for an understanding of the present invention is shown in FIG. 1 hereof.

In accordance with the present invention an inwardly directed spray 25 is discharged from the manifold housing 16 across the gas passage 18 and around its entire periphery. The manifold 16 is formed with an annular passage 26 which extends entirely around the vessel 10 and is supplied with spray liquid from one or more supply pipes 27. An annular slot 28 is formed in the inner wall 29 of the manifold 16 to form, in effect, an annular nozzle through which the spray is ejected toward the axis of the vessel 10. The slot 28 may be contoured in transverse section to produce the desired spray pattern.

The passage 26 is shown in FIG. 2 as tapered in cross section from the zone of the inlet pipe 27 to the diametrically opposite zone in order to compensate for the loss of liquid through the spray slot 28 as the liquid flows along the annular passage 26.

FIG. 2 illustrates an embodiment of this type wherein a single inlet pipe 27 is used. FIG. 3 illustrates an embodiment wherein a pair of diametrically opposed inlet pipes 27 are used. In this embodiment the annular passage 26a is tapered in opposite directions from the zone of each inlet pipe to a midpoint displaced by 90° therefrom. It is obvious that additional inlet pipes may be spaced around the manifold and the passage 26 may be correspondingly tapered from each inlet pipe to the midpoint between such pipes. Such construction serves to maintain equality in pressure and uniformity of spray pattern around the entire periphery of the vessel.

The outwardly directed spray 21 and the inwardly directed spray 25 may be disposed to impinge upon each other or may be axially offset according to the effect desired. In either case the gas stream is subjected to the action of the two sprays, the droplets of which impinge upon suspended matter in the stream and serve to envelop and remove the same due to the kinetic energy of the liquid droplets. Due to the converging paths of the spray from the manifold 16 additional agglomeration and surface areas of spray are provided and turbulence is introduced which assists in the effective removal of the suspended matter from the gases which pass therethrough.

Either or both of the spray patterns may be directed horizontally or at an upwardly or downwardly inclined angle according to the effect desired.

It should be noted that the inwardly projecting portion 29 of the manifold 16 forms a constricted zone in the annular passage 18 which produces a venturi effect to increase the velocity of the gas stream. The sprays may be directed to cross the gas stream at or in advance of this venturi section.

In the embodiment of FIGS. 4 to 6 the manifold is formed by the walls 30 of the vessel and by upper and lower annular members 31 and 32 respectively which are secured to the wall 30 by a suitable fluid tight seal. The upper member 31 is shown in cross section having a sloping upper surface 33 and an upwardly sloping lower surface 34.

The lower member 32 has a curved upper surface 35 which is shaped to form, with the inner surface of the wall 30 and with the under surface 34 of the upper annular member 31, an annular fluid passage 36. The inner portion of the lower member 32 is formed with a lip 37 which is contoured and spaced from the under surface 34 of the upper member 31 to form an annular spray passage 38 extending around the entire periphery of the manifold.

This spray passage 38 is shown as inclined upwardly to project an upwardly inclined spray pattern. Obviously, the cooperating surfaces 34 and 37 may be contoured to project the spray horizontally or at selected upwardly or downwardly inclined angles.

The upper member 31 may project slightly beyond the lower member 32 so as to shield the spray opening 38 from suspended particles which might accumulate and clog the same.

In this embodiment three inlet pipes 40 are equally spaced around the periphery of the manifold and above each inlet pipe is a deflector plate 41 having oppositely curved surfaces 42 adapted to deflect the liquid along the annular passage 36 in opposite directions. Such deflector plates provide a more uniform flow of liquid and avoid turbulence which would interfere with the uniformity of the spray pattern.

For flushing out the passage 36 a tangential inlet pipe 43 is provided having a control valve 44. The inlet pipes 40 have an inlet branch 47 connected to a liquid supply pipe, not shown, through a valve 48 and a drain branch 49 to be connected to a drain line, not shown, through a valve 50. The arrangement is such that in normal operation spray liquid is supplied to the passage 36 through pipe 40 and the inlet branch 47. For flushing out the passage the valves are adjusted to feed flush liquid into the passage 36 through pipe 43 and to drain the same through pipe 40 and the drain branch 49.

Figure 8:
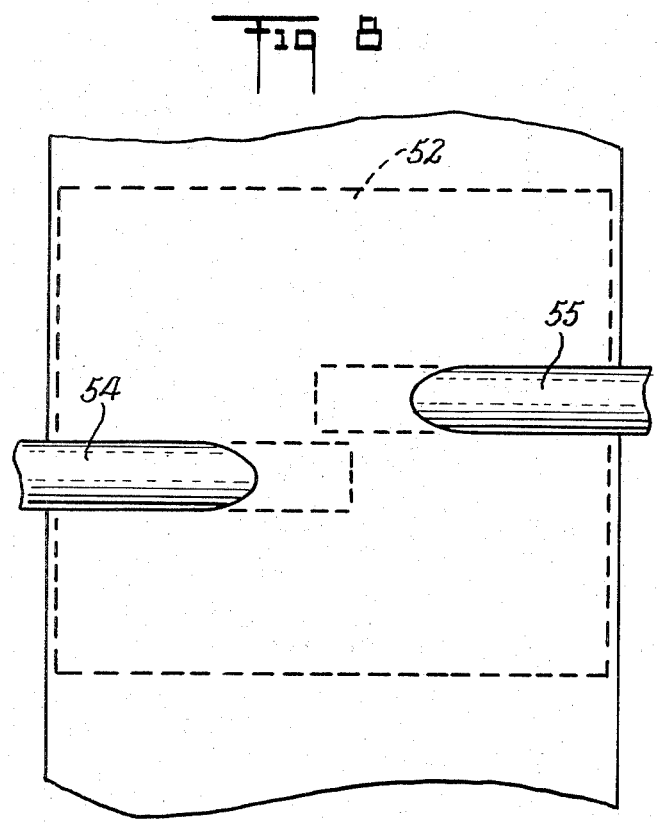
FIG. 8 is a side elevation of the manifold of FIG. 7.

FIGS. 7 and 8 show an inlet arrangement for a manifold 52 having an annular liquid passage 53 comprising a pair of opposed, tangential inlet pipes 54 and 55. These two pipes are disposed one above the other in the passage 53 so that the liquid is passed in two non-interfering streams in opposite directions along the manifold for the purpose above described.

Figure 9:
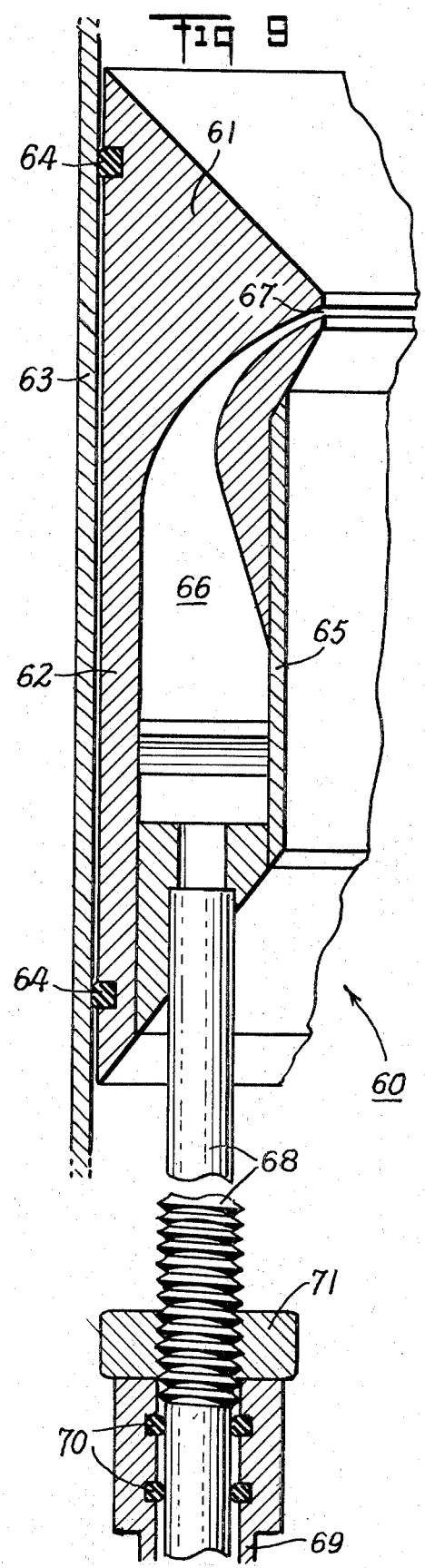
FIG. 9 is a vertical section similar to FIG. 4 illustrating an adjustable manifold.

In the embodiment of FIG. 9 the manifold 60 is made adjustable axially of the vessel walls. The manifold is formed by an upper member 61 of generally triangular cross-section having a circumferential flange 62 which is adapted to slide along the wall 63 of the vessel and is provided with sealing rings 64. A lower member 65 is secured to the upper member 61 to form therewith an annular passage 66 and an annular spray opening 67. One or more telescoping inlet pipes are formed by an upper section 68 attached to the manifold 60 telescoping in a fixed lower section 69 and provided with seals 70. An adjusting nut 71 is shown as threaded on the upper pipe section 68 and engaging the lower pipe section 69 for providing a fine adjustment. The manifold is adjusted axially along the wall 63 of the vessel by varying the telescoping position of the inlet pipe or pipes. This adjustment may be made to position the spray with respect to the venturi throat or with respect to the entrance end of the annular gas passage 18.

The spray manifold has been shown as embodied in a gas washing apparatus for purposes of illustration. It is obvious that it is applicable to various uses wherein a uniform radial spray pattern is required. The arrangement is such that the intensity and velocity of the spray may be controlled and a predetermined spray pattern can be obtained.

We claim:

1. Gas washing apparatus comprising a vessel having peripheral walls, an axial post in said vessel forming with said walls an annular gas passage, means passing gases for washing along said annular passage and spray means opposing said post disposed adjacent said peripheral walls to eject a spray of liquid radially inward of said walls across said annular passage onto said post, said spray means comprising an annular manifold having an annular liquid passage and having an elongated annular slot disposed to eject a continuous liquid spray from said passage inwardly across said gas passage, wherein said annular liquid passage is tapered in cross-section to compensate for pressure differential in said passage and maintain a uniform spray pattern.

2. Apparatus as set forth in claim 1 in which said manifold is fixed to said walls.

3. Apparatus as set forth in claim 1 in which said manifold is adjustable along said walls.

4. Apparatus as set forth in claim 1 in which said manifold projects inwardly from said walls into said annular gas passage to form a venturi throat through which said gases pass.

5. Apparatus as set forth in claim 1 including an axially mounted spray nozzle disposed to eject a spray of liquid radially outwardly across said gas passage.

6. Apparatus as set forth in claim 5 in which said axial spray nozzle and said manifold are so disposed that the inward and outward sprays ejected therefrom impinge to form a concentrated spray zone through which the gases pass.

7. Apparatus as set forth in claim 5 in which said axial spray nozzle and said manifold are offset axially so as to produce offset spray zones through which the gases pass in succession.

8. Apparatus as set forth in claim 1 in which said annular slot is continuous.

9. Apparatus as set forth in claim 1 including at least one inlet pipe connected to supply spray liquid to said passage.

* * * * *